(12) United States Patent
Wu (10) Patent No.: US 8,358,851 B2
(45) Date of Patent: Jan. 22, 2013

(54) DIGITAL IMAGE ANALYZING METHOD AND RELATED COMPUTER PROGRAM PRODUCT

(75) Inventor: Paul Neng-Wei Wu, Hsinchu (TW)

(73) Assignee: Anmo Electronics Corporation, Hsinchu (TW)

( * ) Notice: Subject to any disclaimer, the term of this patent is extended or adjusted under 35 U.S.C. 154(b) by 345 days.

(21) Appl. No.: 12/840,876

(22) Filed: Jul. 21, 2010

(65) Prior Publication Data

US 2011/0235917 A1    Sep. 29, 2011

(30) Foreign Application Priority Data

Mar. 29, 2010   (TW) .............................. 99109318 A (51) Int. Cl.
  *G06K 9/48* (2006.01)
(52) U.S. Cl. ....................... 382/199; 715/247
(58) Field of Classification Search ............... 382/100, 382/181, 190, 195, 199, 203, 143, 166, 170; 715/247
See application file for complete search history.

(56) References Cited

U.S. PATENT DOCUMENTS

| | | | |
|---|---|---|---|
| 4,981,372 A * | 1/1991 | Morimoto et al. ........... 382/151 |
| 5,493,640 A * | 2/1996 | Itoh et al. ..................... 345/441 |
| 5,579,410 A * | 11/1996 | Ami et al. ..................... 382/203 |
| 5,881,170 A * | 3/1999 | Araki et al. ................... 382/199 |
| 5,910,817 A | 6/1999 | Ohashi et al. |
| 5,917,934 A | 6/1999 | Chiu et al. |
| 5,949,913 A * | 9/1999 | Shimazu et al. .............. 382/254 |
| 5,995,662 A * | 11/1999 | Totsuka et al. ................ 382/199 |
| 5,995,663 A * | 11/1999 | Itsuzaki et al. ............... 382/203 |
| 6,167,150 A * | 12/2000 | Michael et al. ............... 382/149 |
| 6,335,985 B1 * | 1/2002 | Sambonsugi et al. ........ 382/190 |
| 7,982,798 B2 * | 7/2011 | Adams .......................... 348/448 |
| 2005/0275834 A1 | 12/2005 | Silver |
| 2007/0183666 A1 | 8/2007 | Ding |
| 2009/0010482 A1* | 1/2009 | Nishida et al. ................ 382/100 |
| 2011/0222779 A1* | 9/2011 | Karanam et al. ............. 382/199 |

FOREIGN PATENT DOCUMENTS

| | | |
|---|---|---|
| CN | 1080911 C | 3/2002 |
| EP | 1622082 A2 | 2/2006 |
| WO | WO 2008/111724 A1 | 9/2008 |

OTHER PUBLICATIONS

Mischi et al., "Cardiac Image Segmentation for Contrast Agent Videodensitometry," IEEE Transactions on Biomedical Engineering, vol. 52, No. 2, Feb. 2005, pp. 277-286, XP011125713.

\* cited by examiner

*Primary Examiner* — Anand Bhatnagar
(74) *Attorney, Agent, or Firm* — Birch, Stewart, Kolasch & Birch, LLP (57) ABSTRACT

A computer program product capable of enabling a computer to perform a digital image analyzing operation, wherein the digital image analyzing operation comprises: receiving settings of a plurality of lines corresponding to one or more image edges of a digital image; and identifying a plurality of intersections of the plurality of lines and the one or more image edges of the digital image.

20 Claims, 9 Drawing Sheets

DIGITAL IMAGE ANALYZING METHOD AND RELATED COMPUTER PROGRAM PRODUCT

CROSS-REFERENCE TO RELATED APPLICATIONS

This application claims the benefit of priority to Taiwanese Patent Application No. 099109318, filed on Mar. 29, 2010, the entirety of which is incorporated herein by reference for all purpose.

BACKGROUND

The present disclosure generally relates to digital image analysis technology, and more particularly, to methods and computer program products related to digital image recognization or image measurement.

Digital image recognition technology has been widely applied in various fields, such as product inspection, microscopic measurement, image object recognition, or the like, to determine image features (e.g., image edges or appearance) for particular portions of a digital image.

However, in conventional digital image recognition methods, the processor of a computer has to compare and analyze all pixel values of the digital image, and therefore requires consuming considerable computing resource. Thus, the processing speed of conventional digital image recognization methods is restricted by the computing power of the computer and is difficult to be realized in apparatus with low computing resource.

In addition, image features such as image texture, image shape, or the like may usually influence the conventional image recognition methods and thus deteriorate the accuracy of image recognition.

In view of the foregoing, it can be appreciated that a substantial need exists for methods and apparatuses that can mitigate or reduce the problems in conventional digital image recognition technology.

SUMMARY

An exemplary embodiment of a computer program product capable of enabling a computer to perform a digital image analysis operation is disclosed, wherein the digital image analysis operation comprises: receiving settings of a plurality of lines corresponding to one or more image edges of a digital image; and identifying a plurality of intersections of the plurality of lines and the one or more image edges of the digital image.

An exemplary embodiment of a digital image analyzing method is disclosed comprising: receiving settings of a plurality of lines corresponding to one or more image edges of a digital image; and identifying a plurality of intersections of the plurality of lines and the one or more image edges of the digital image.

It is to be understood that both the foregoing general description and the following detailed description are exemplary and explanatory only and are not restrictive of the invention, as claimed.

DETAILED DESCRIPTION

Reference will now be made in detail to exemplary embodiments of the invention, which are illustrated in the accompanying drawings. The same reference numbers may be used throughout the drawings to refer to the same or like parts or operations.

Certain terms are used throughout the description and following claims to refer to particular components. As one skilled in the art will appreciate, vendors may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ."

Figure 1:
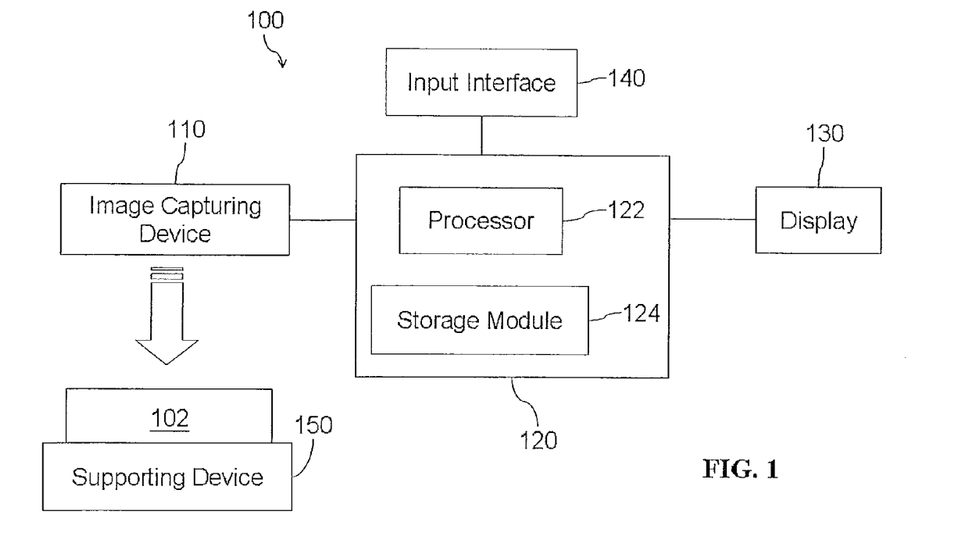
FIG. 1 is a simplified functional block diagram of a digital image analyzing device in accordance with an exemplary embodiment.

FIG. 1 shows a simplified functional block diagram of a digital image analyzing device 100 in accordance with an exemplary embodiment. As shown in FIG. 1, the digital image analyzing device 100 comprises an image capturing device 110, a host 120, a display 130, and an input interface 140. The image capturing device 110, the display 130, and the input interface 140 are coupled with the host 120. The phrase "coupled with" as used herein is intended to compass any indirect or direct connection. In other words, each of the image capturing device 110, the display 130, and the input interface 140 may be directly connected to the host 120 (including through an electrical connection or other signal connections, such as wireless communications or optical communications), or may be indirectly connected to the host 120 through an indirect electrical connection or signal connection via other intermediate device or connection means.

The image capturing device 110 is used for sensing images of a target object 102 positioned on a supporting device 150. In implementations, the image capturing device 110 may be a digital camera, digital video recorder, digital microscope, and any other apparatus with image sensing capability. In this embodiment, the host 120 comprises a processor 122 and a storage module 124. The storage module 124 may be implemented with one or more storage media.

The digital image analyzing device 100 may be used for conducting digital image recognition or digital image measuring operations. The operations of the digital image analyzing device 100 will be described in further detail with reference to FIG. 2.

Figure 2:
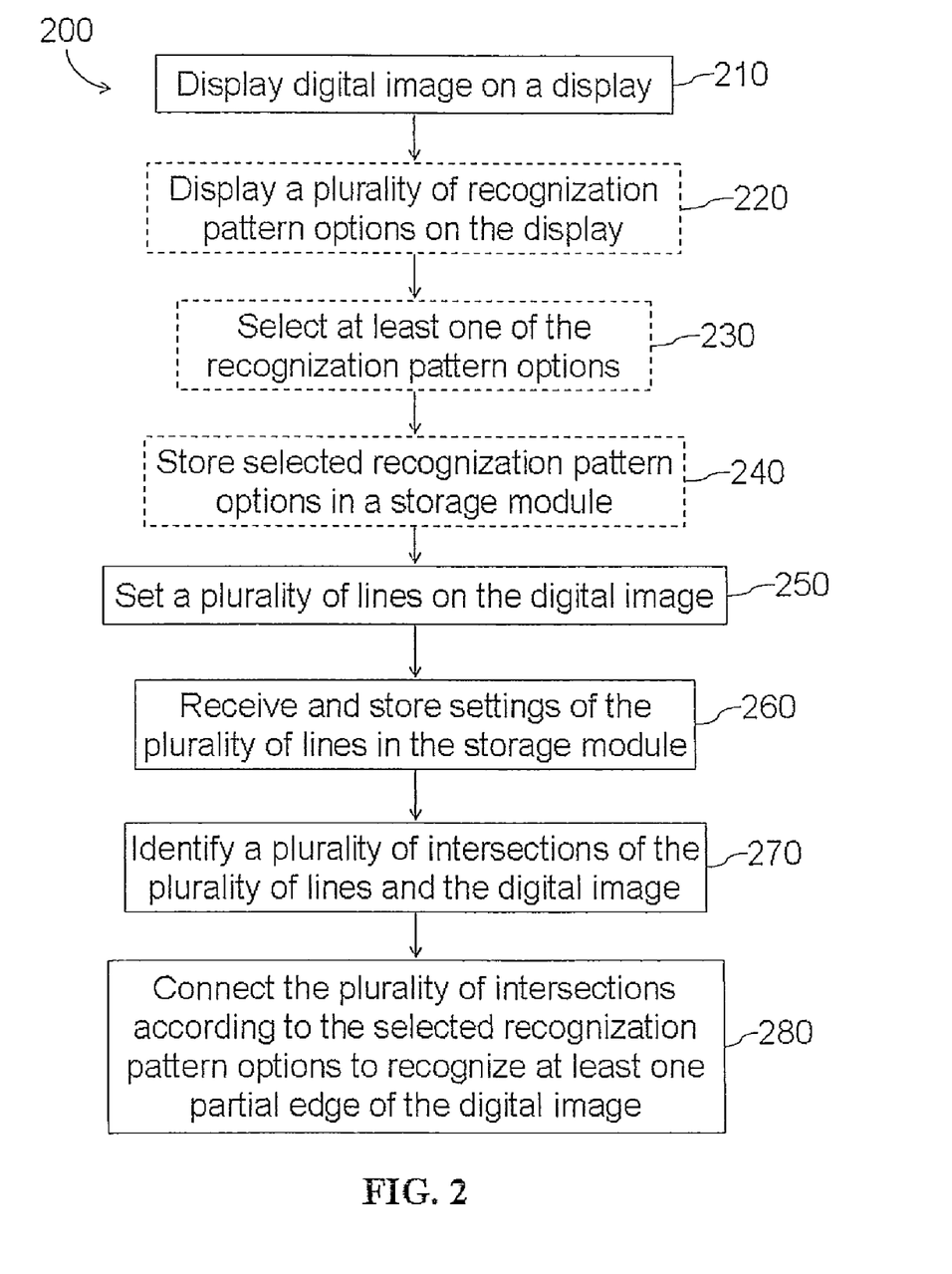
FIG. 2 is a flowchart illustrating a digital image recognization method according to an exemplary embodiment.

FIG. 2 is a flowchart 200 illustrating a digital image recognition method according to an exemplary embodiment.

Figure 3:
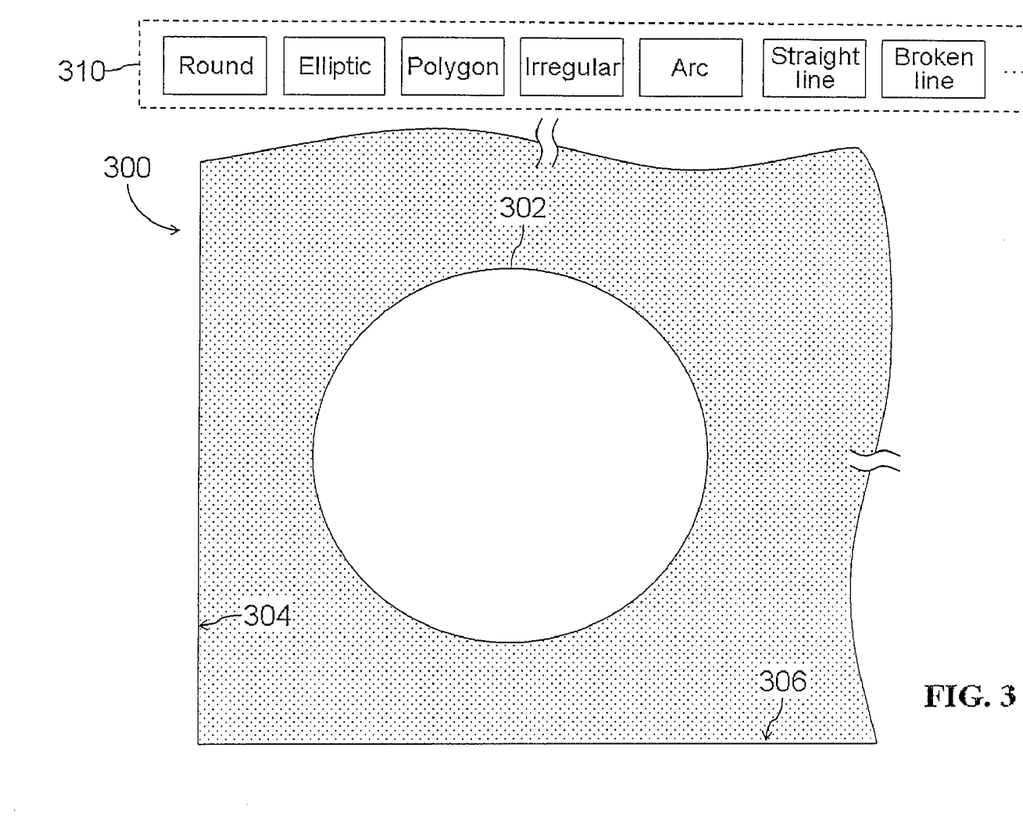
FIG. 3 and FIG. 4 are simplified schematic diagrams of a partial image of a circuit board sensed by the image capturing device of FIG. 1.

In an operation 210, the processor 122 of the host 120 displays the image of the target object 102 sensed by the image capturing device 110 on the display 130. For example, a digital image 300 shown in FIG. 3 is a partial image of a circuit board sensed by the image capturing device 110. Reference number 302 denotes an opening on the circuit board, and reference numbers 304 and 306 denote two sides of the circuit board.

Recognition of image edges is very important for digital image recognition operations. The shape of the image may be recognized once the image edges are identified. In order to reduce required computing resource for digital image recognition operations and increase the recognition speed and accuracy, the digital image analyzing device 100 interacts with the user when conducting digital image recognition operations, and requests the user to provide auxiliary information for determining the edges and/or shape of the digital image. The recognition operations for the opening 302 of the circuit board will be used as an example in the following descriptions.

In an operation 220, the processor 122 displays a plurality of recognition pattern options in the form of characters or pictures on the display 130 for the user to select. For example, as shown in FIG. 3, the processor 122 may group multiple recognition pattern options in the form of character buttons as an item bar 310 and show on the display 130. Each recognition pattern option has a corresponding image edge computing algorithm that can be implemented with computer program codes and stored in the storage module 124. The type and amount of the recognition pattern options descried previously is merely an example, not intended to restrict the practical implementations. In practice, the type and amount of the recognition pattern options may be increased, decreased, or changed based on the design requirement.

In an operation 230, the user is required to select one or more recognition patterns related to the shape of the digital image 300 out of the plurality of recognition pattern options shown in the item bar 310. In operations, the user may select one or more recognition pattern options through the input interface 140 by using the cursor selection, touch control, voice control, or other commanding approaches. In this embodiment, the user may select the recognition pattern option "Round" as it is most approximate to shape of the opening 302 of the circuit board.

In an operation 240, the host 120 receives settings of the recognition pattern selected by the user from the input interface 140 and stores the settings in the storage module 124 as reference basis of image recognition operations to be performed by the processor 122.

In an operation 250, the user is required to set a plurality of lines on the digital image 300. The user may roughly draw a plurality of lines corresponding to the image edge of the opening 302 to be recognized on the digital image 300 through the input interface 140 by using the mouse drag approach or touch control approach. The quantity of lines needed to be set in the operation 250 depends upon the recognition pattern selected by the user. For example, if the selected recognition pattern is "Round" or "Arc," the user is required to input at least three lines in the operation 250. If the selected recognition pattern is "Straight line," the user is required to input at least two lines in the operation 250. If the selected recognition pattern is "Polygon" or "Irregular," more lines are required in the operation 250.

In one embodiment, each line is only required to intersect an image edge of the image object to be recognized, i.e., the two terminals of each line should be on the opposing sides of the image edge. There is no restriction on the length of each line. Additionally, each line may be a curve or irregular line, and not restricted in a straight line. In order to reduce the computing complexity, it is preferred that each line only intersects one image edge. In implementations, the display 130 and the input interface 140 may be integrated together. For example, a touch screen may be utilized to implement the functions of both the display 130 and the input interface 140.

Figure 4:
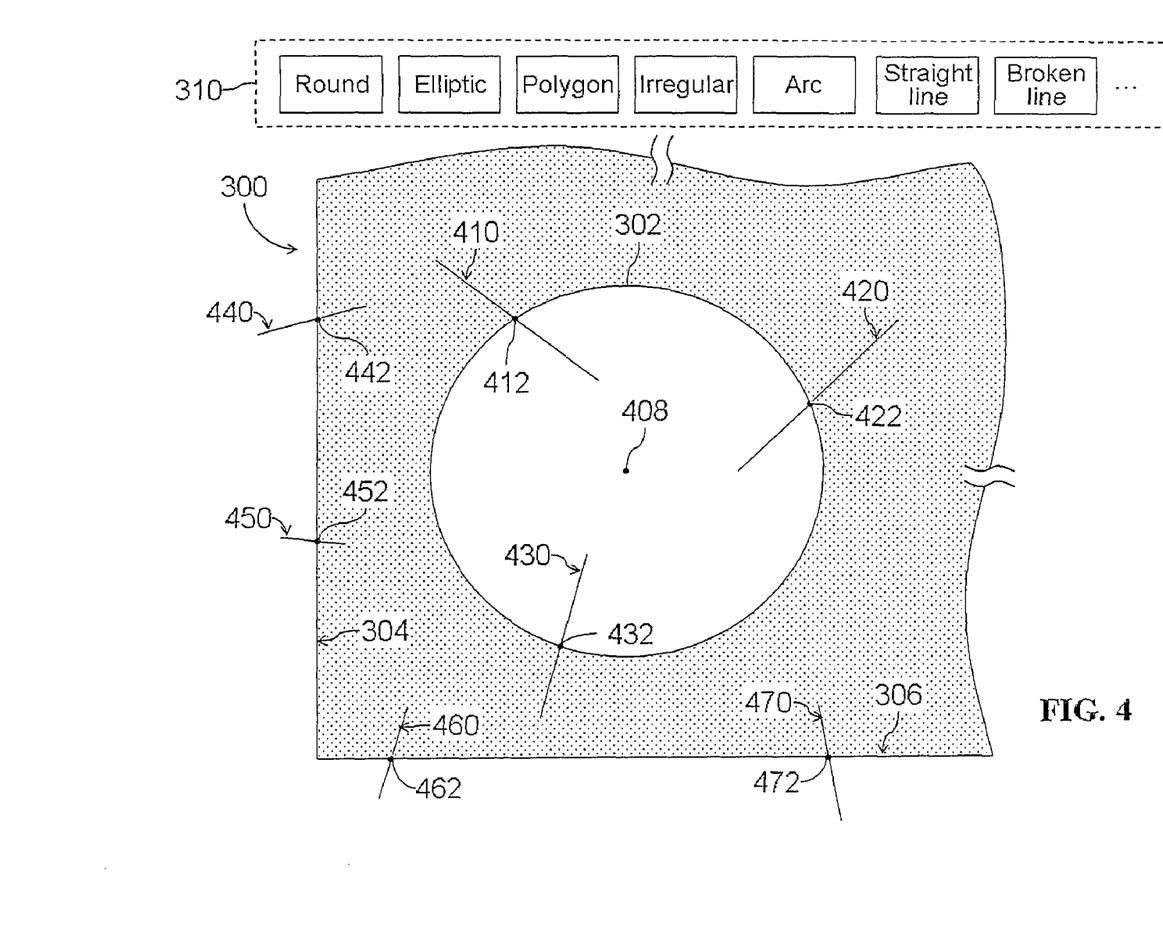

In one embodiment shown in FIG. 4, the user roughly draws three lines 410, 420, and 430 on the digital image 300, and each of which intersects the image edge of the opening 302.

In an operation 260, the host 120 receives the settings of multiple lines inputted by the user via the input interface 140, and stores the line settings in the storage module 124 as reference basis of image recognition operations to be performed by the processor 122.

In an operation 270, the processor 122 reads the settings of the plurality of lines stored in the storage module 124, and identifies a plurality of intersections of the plurality of lines and one or more image edges of the opening 302 in the digital image 300. For example, the processor 122 of this embodiment calculates and obtains an intersection 412 of the line 410 and the image edge of the opening 302, an intersection 422 of the line 420 and the image edge of the opening 302, and an intersection 432 of the line 430 and the image edge of the opening 302.

The processor 122 may calculate the intersection of each line and the image edge of the opening 302 in various ways. In one embodiment, the processor 122 may compute pixel value difference between adjacent pixels on the path of each line, and set a position with the maximum pixel value difference as the intersection of the line and the image edge of the opening 302. This intersection calculating approach may be applied in the applications where there is an obvious pixel value difference between pixels on the opposing sides of the image edge.

Please note that the term "pixel value" as used throughout the specification and following claims may be luminance or chrominance of the pixel.

In another embodiment, the processor 122 may compute pixel value difference between adjacent pixels on the path of each line along a predetermined direction, and set the first position where the pixel value difference reaches or exceeds a predetermined threshold as the intersection of the line and the image edge of the opening 302. This intersection calculating approach may be applied in the applications where there is no obvious pixel value difference between pixels on the opposing sides of the image edge, but the pixel value of pixels on the image edge is apparently different from that of pixels on both sides of the image edge. For illustrative purpose, a partial enlarged diagram of the digital image 300 shown in FIG. 5 will be taken as an example in the following.

Figure 5:
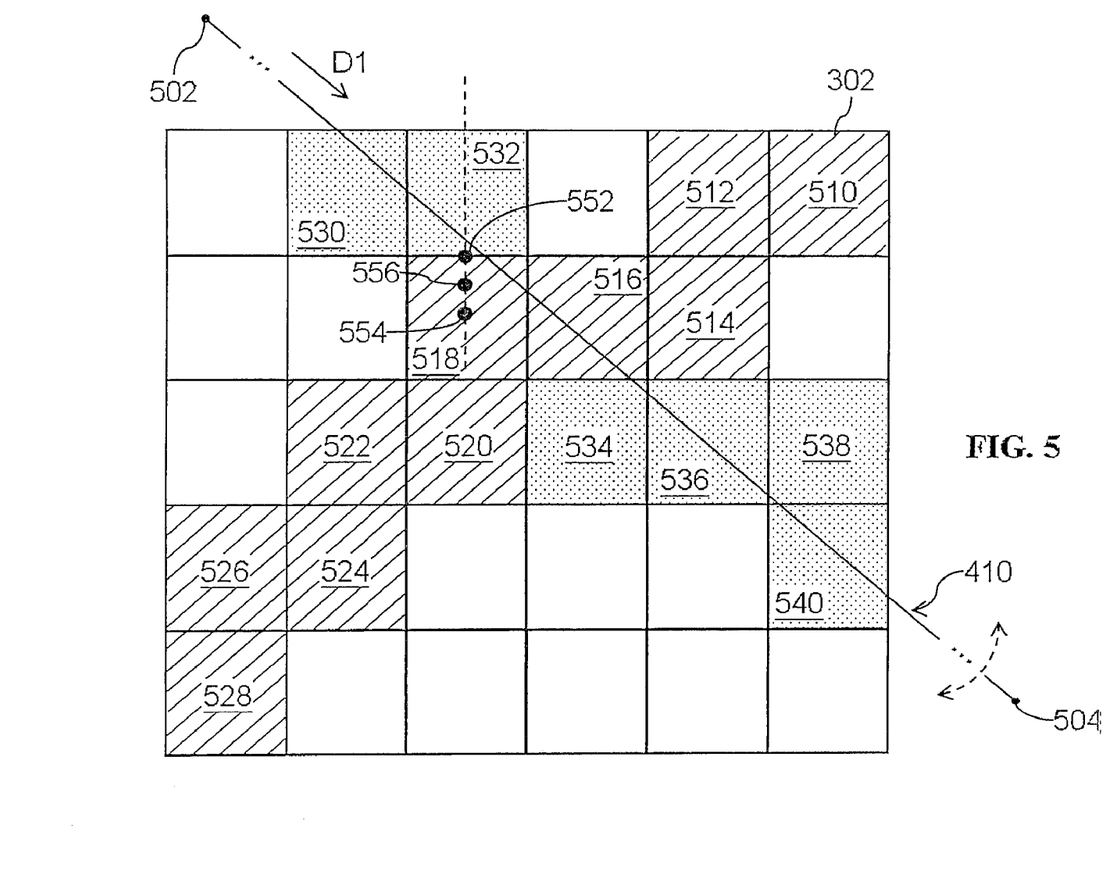
FIG. 5 is a partial enlarged diagram of the digital image of FIG. 4.

In FIG. 5, pixels 510, 512, 514, 516, 518, 520, 522, 524, 526, and 528 are part of pixels on the image edge of the opening 302. Pixels 530, 532, 518, 516, 534, 536, 538, and 540 are part of pixels on the path of the line 410. Reference numbers 502 and 504 denote the two terminals of the line 410. The user may fine tune the intersection of the line 410 and the image edge of the opening 302 by moving one terminal of the line 410, such as the terminal 504, clockwise or counterclockwise. The method for setting an intersection of a line and an image edge described above offers higher precision level for the intersection setting compared to the conventional way where the intersection on the image edge is directly set by the user using the mouse click or touch control approaches.

The processor 122 may compute pixel value difference between adjacent pixels on the path of the line 410 along a predetermined direction D1. For example, the processor 122 may first compute the pixel value difference between the pixels 530 and 532, then the pixel value difference between the pixels 532 and 518, and then the pixel value difference between the pixels 518 and 516, and so forth. The processor 122 compares each obtained pixel value difference with the predetermined threshold. In this embodiment, the pixel value difference between the pixels 532 and 518 is the first pixel value difference that exceeds the predetermined threshold. Accordingly, the processor 122 may omit the subsequent pixel value difference calculations and set an intersection 552 of the pixels 532 and 518 as the intersection 412 of the line 410 and the image edge of the opening 302.

In another embodiment, the processor 122 may first compute a median or mean value of a plurality of pixel values (e.g., all of the pixel values) on the path of the line 410 and set the median or mean value as a threshold. That is, the setting of the threshold may be dynamically adjusted. Then, the processor 122 compares the pixel value of pixels on the path of the line 410 in turn with the obtained threshold along the direction D1, and set the first position where the pixel value reaches or is across the threshold as the intersection 412 of the line 410 and the image edge of the opening 302. Assuming the pixel 518 on the path of the line 410 is the first pixel that has a pixel value reaching or equal to the threshold along the direction D1, the processor 122 may omit subsequent pixel value comparisons and set a center position 554 of the pixel 518 as the intersection 412 of the line 410 and the image edge of the opening 302.

Assuming the pixel 518 on the path of the line 410 is the first pixel whose pixel value is across the threshold along the direction D1, i.e., the first pixel whose pixel value is either greater than or less than the threshold, the processor 122 may omit subsequent pixel value comparisons and set the intersection 552 of the pixels 518 and 532 as the intersection 412 of the line 410 and the image edge of the opening 302. In another embodiment, the processor 122 may perform an interpolation calculation on the pixel values of the pixels 518 and 532 to obtain a position 556 corresponding to the threshold, and set the position 556 as the intersection 412 of the line 410 and the image edge of the opening 302.

It can be appreciated from the above descriptions that the precision of intersection of each line and the image edge of an image object identified by the processor 122 could be less than a pixel.

In an operation 280, the processor 122 connects the plurality of intersections obtained in the operation 270 according to the recognition pattern selected in the operation 230 to recognize one or more edge portions or whole boundary of the digital image 300. For example, in this embodiment, the recognition pattern selected by the user in the operation 230 is "Round," the processor 122 thus determines a circumference based on the three intersections 412, 422, and 432 identified in the operation 270 as the image edge recognition result of the opening 302.

After recognized the boundary of an image object, such as the circumference of the opening 302, the processor 122 may further calculate a location of a geometrical feature of the image object, such as a center 408 of the opening 302.

The recognition operations for the side 304 of the circuit board will be used as another example below to describe the digital image recognition method of exemplary embodiments.

Since the side 304 of the circuit board is a straight edge, the user may select the recognition pattern option "Straight line" in the operation 230 as it is most approximate to shape of the side 304 of the circuit board, and set two lines 440 and 450 that intersect the image edge of the side 304 of the circuit board in the operation 250.

In the operation 270, the processor 122 may utilize one of aforementioned methods to identify an intersection 442 of the line 440 and the image edge of the side 304 of the circuit board, and an intersection 452 of the line 450 and the image edge of the side 304 of the circuit board.

In the operation 280, since the recognition pattern setting stored in the storage module 124 is "Straight line," the processor 122 determines an edge line based on the intersections 442 and 452 as the image edge recognition result for the side 304 of the circuit board.

In another embodiment, the user selects the recognition pattern option "Broken line" which is most similar to the shape of the two sides 304 and 306 of the circuit board in the operation 230. Then, the user in the operation 250 sets two lines 440 and 450 that intersect the image edge of the side 304 of the circuit board, and sets two lines 460 and 470 that intersect the image edge of the side 306 of the circuit board. In the operation 270, the processor 122 determines an intersection 442 of the line 440 and the image edge of the side 304 of the circuit board, an intersection 452 of the line 450 and the image edge of the side 304 of the circuit board, an intersection 462 of the line 460 and the image edge of the side 306 of the circuit board, and an intersection 472 of the line 470 and the image edge of the side 306 of the circuit board by utilizing above approaches.

Then, the processor 122 in the operation 280 connects the intersections 442, 452, 462, and 472 to form an L-shaped edge line as the image edge recognition result for both the sides 304 and 306 of the circuit board based on the indication of the recognition pattern "Broken line".

Once the positions of the center 408 of the opening 302 and the sides 304 and 306 of the circuit board are obtained, the processor 122 is able to calculate a distance between the center 408 and the side 304 or the side 306 of the circuit board.

According to the foregoing illustrations, it can be appreciated that the digital image recognition methods described above are able to calculate and obtain an intersection of a line and a specific image edge by simply analyzing the pixel values on the path of the line, and then accomplishes the image edge recognition purpose. Since there is no need to analyze all the pixels of the digital image 300, the computing resource required by the processor 122 can be greatly reduced. In addition, since the processor 122 performs the image recognition operations based on the recognition patterns selected by the user, the digital image recognition accuracy for the image edges or shape can be significantly improved.

In applications, the digital image analyzing device 100 may be utilized to implement product inspection or quality control purposes. For example, the supporting device 150 may be implemented by a conveyor for periodically transporting target objects (such as the aforementioned circuit board) to be inspected to an inspection area aimed by the image capturing device 110. Target objects to be inspected usually have similar image features. Thus, the user only needs to input appropriate auxiliary information (such as image recognition patterns, settings of lines corresponding to image edges of the image object, or the like) to the host 120 at the first time the image capturing device 110 conducting image capturing and recognition operations, the image capturing device 110 would automatically perform the image recognition operations for subsequent target objects based on the same auxiliary information so as to realize yield rate determination or defect detection. Further details will be described in the following with reference to an example shown in FIG. 6.

Figure 6:
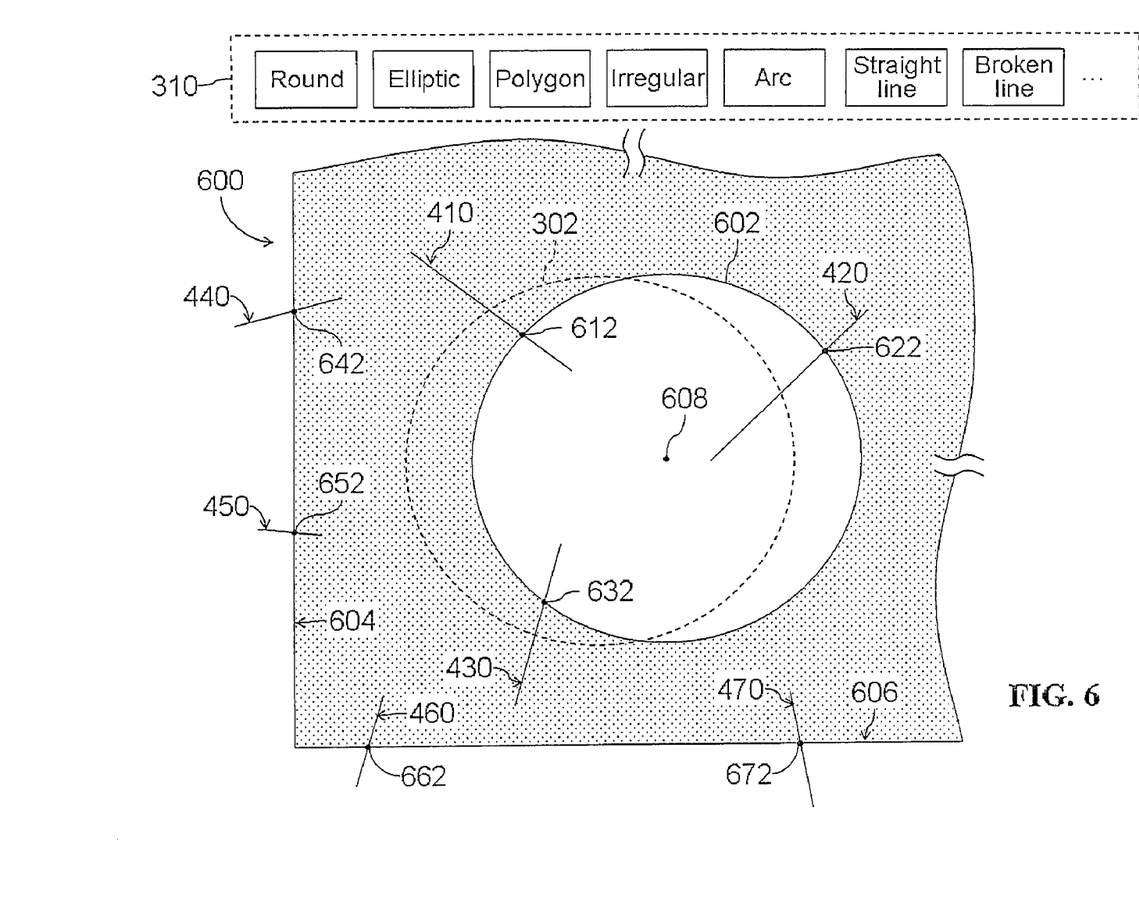
FIG. 6 is a simplified schematic diagram of a partial image of another circuit board sensed by the image capturing device of FIG. 1.

In FIG. 6, a digital image 600 is a partial image of another circuit board sensed by the image capturing device 110. Reference number 602 denotes an opening on the circuit board, and reference numbers 604 and 606 denote two sides of the circuit board. In general, difference between two products made by the same production process is usually within a limited range. Thus, the digital image analyzing device 100 may maintain the settings of the auxiliary lines 410, 420, 430, 440, 450, 460, and 470 and the recognition patterns "Round" and "Broken line" (or "Straight line") selected by the user during the recognition operations for the digital image 300. The processor 122 may utilize one of the aforementioned digital image recognition methods to automatically identify an intersection 612 of the line 410 and the image edge of the opening 602, an intersection 622 of the line 420 and the image edge of the opening 602, and an intersection 632 of the line 430 and the image edge of the opening 602. The processor 122 then utilizes the three intersections 612, 622, and 632 to determine a circumference of the opening 602 based on the recognition pattern "Round," and calculates a center 608 of the opening 602.

Similarly, the processor 122 may utilize one of the aforementioned digital image recognition methods to identify an intersection 642 of the line 440 and the image edge of the side 604 of the circuit board, an intersection 652 of the line 450 and the image edge of the side 604 of the circuit board, an intersection 662 of the line 460 and the image edge of the side 606 of the circuit board, and an intersection 672 of the line 470 and the image edge of the side 606 of the circuit board. In the operations 280, the processor 122 connects the intersections 642, 652, 662, and 672 to form an L-shaped edge line as the image edge recognition result for both the sides 604 and 606 of the circuit board based on the setting of the recognition pattern "Broken line".

Afterward, the processor 122 may further calculate a distance between the center 608 of the opening 602 and the side 604 and/or the side 606 of the circuit board to determine whether the location of the opening 602 complies with a predetermined specification requirement, and then accordingly determine whether the circuit board is a qualified product.

According to the foregoing descriptions, it can be appreciated that when applied in product inspections, the digital image recognition methods disclosed previously are able to complete the inspection of subsequent products in a nearly automatic way and only require minimum input from the user, such as setting the image recognition patterns and some simple lines. Furthermore, since the computing resource required for the above image recognition and product inspection operations is much lower than the conventional approaches, the efficiency of the quality control system can be improved, and related hardware cost can be further reduced.

In addition to product inspection applications, the digital image analyzing device 100 can also apply the foregoing digital image recognition methods in object positioning and alignment applications. For example, when the processor 122 of the host 120 identified a relative location and distance between the target object 102 and one or more particular locations (e.g., positioning line, positioning edge, position corner, positioning point, or the like) on the supporting device 150, the processor 122 may control the supporting device 150 to more or rotate the target object 102 to a predetermined location, thereby realizing object positioning or alignment.

The above digital image recognition methods can also be employed to recognize partial edges of whole boundary of a digital image having a concave shape. For example, for a concave digital image 700 shown in FIG. 7, the user may select the recognition pattern option "Polygon" in the operation 230 as it is most approximate to the shape of the main body of the digital image 700, and set a plurality of lines 720, 730, 740, 750, 760, 770, 780, and 790 that intersect image edges of the digital image 700 in the operation 250. By utilizing the aforementioned intersection calculations, the processor 122 calculates and obtains intersections 722, 732, 742, 752, 762, 772, 782, and 792 of the lines and the image edges of the digital image 700 based on the above settings in the operation 270.

Figure 7:
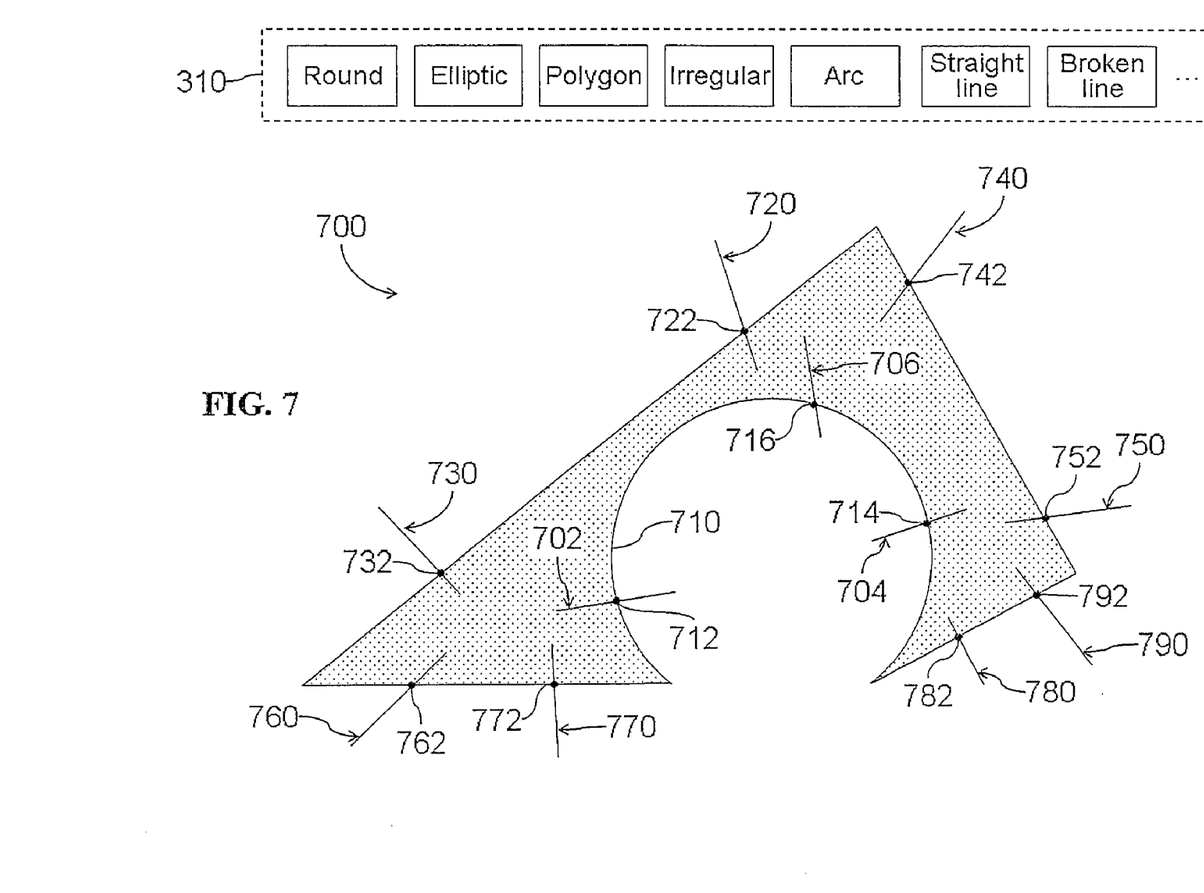
FIG. 7 is a simplified schematic diagram of an image of an object having a concave shape sensed by the image capturing device of FIG. 1.

In addition, the user may repeat the aforementioned digital image recognition methods, but select the recognition pattern option "Arc" and set lines 702, 704, and 706 that intersect an arc 710 of the digital image 700. As a result, the processor 122 recognizes intersections 712, 714, and 716 of the arc 710 and the lines 702, 704, and 706, respectively.

Once the intersections 712, 714, 716, 722, 732, 742, 752, 762, 772, 782, and 792 are obtained, the processor 122 performs the operation 280 based on the recognition pattern settings "Polygon" and "Arc" to determine multiple image edge lines of the digital image 700. Then, the processor 122 could rapidly recognize the whole boundary and shape of the digital image 700 by connecting the recognized edge lines.

For a digital image with an irregular shape, the user may select the recognition pattern option "Irregular" in the operation 230 and set a number of lines that intersect the image edges of the irregular digital image in the operation 250. In general, the processor 122 can achieve higher recognition accuracy for the shape of the digital image as the number of lines set by the user increases.

Please note that the executing order for the operations in the flowchart 200 described above is merely an example, not intended to restrict the practical implementations of the present invention. For example, the operations 230 and 240 can be adjusted to behind the operations 250 and 260. Additionally, the digital image analyzing device 100 may be designed to only recognize digital images of target objects having the same shape. In such applications, the operations 220, 230, and 240 may be omitted.

Figure 8:
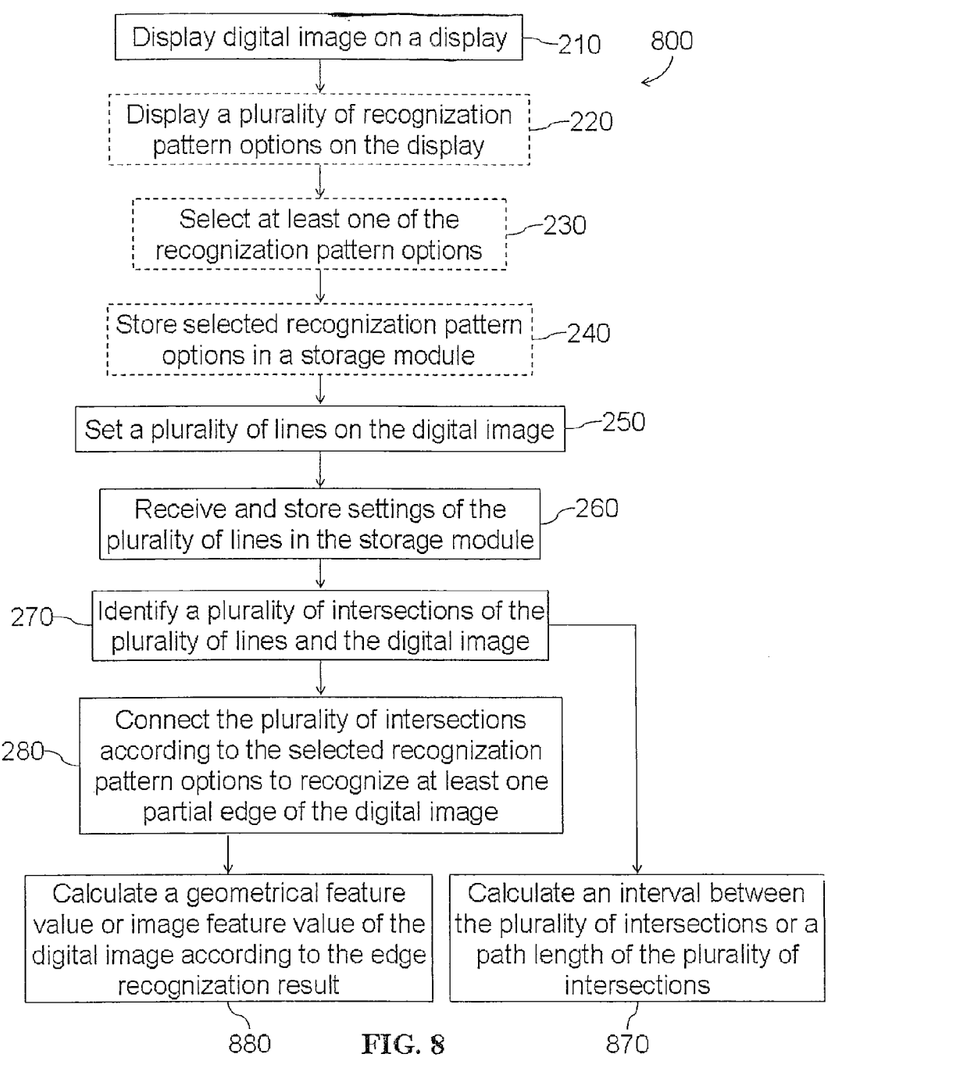
FIG. 8 is a flowchart illustrating a digital image measuring method according to an exemplary embodiment.

The digital image analyzing device 100 may further apply the aforementioned digital image recognition methods in digital image measurements. For example, FIG. 8 shows a flowchart 800 illustrating a digital image measuring method according to an exemplary embodiment. The operations 210 through 280 of the flowchart 800 are similar to the operations labeled the same in the flowchart 200. For the sake of brevity, similar descriptions will not repeat here.

As shown in FIG. 8, after identifying a plurality of intersections on the digital image in the operation 270, the processor 122 may further perform an operation 870 to calculate an interval between two intersections or a path length of the plurality of intersections according to a zooming scale of the digital image, and converts the length value from pixel distance into real length value.

In addition, after recognizing partial edge portions or whole boundary of the digital image in the operation 280, the processor 122 may further perform an operation 880 to calculate a specific image feature value of the digital image according to the edge recognition result. Further details will be described in the following with reference to an example shown in FIG. 9.

Figure 9:
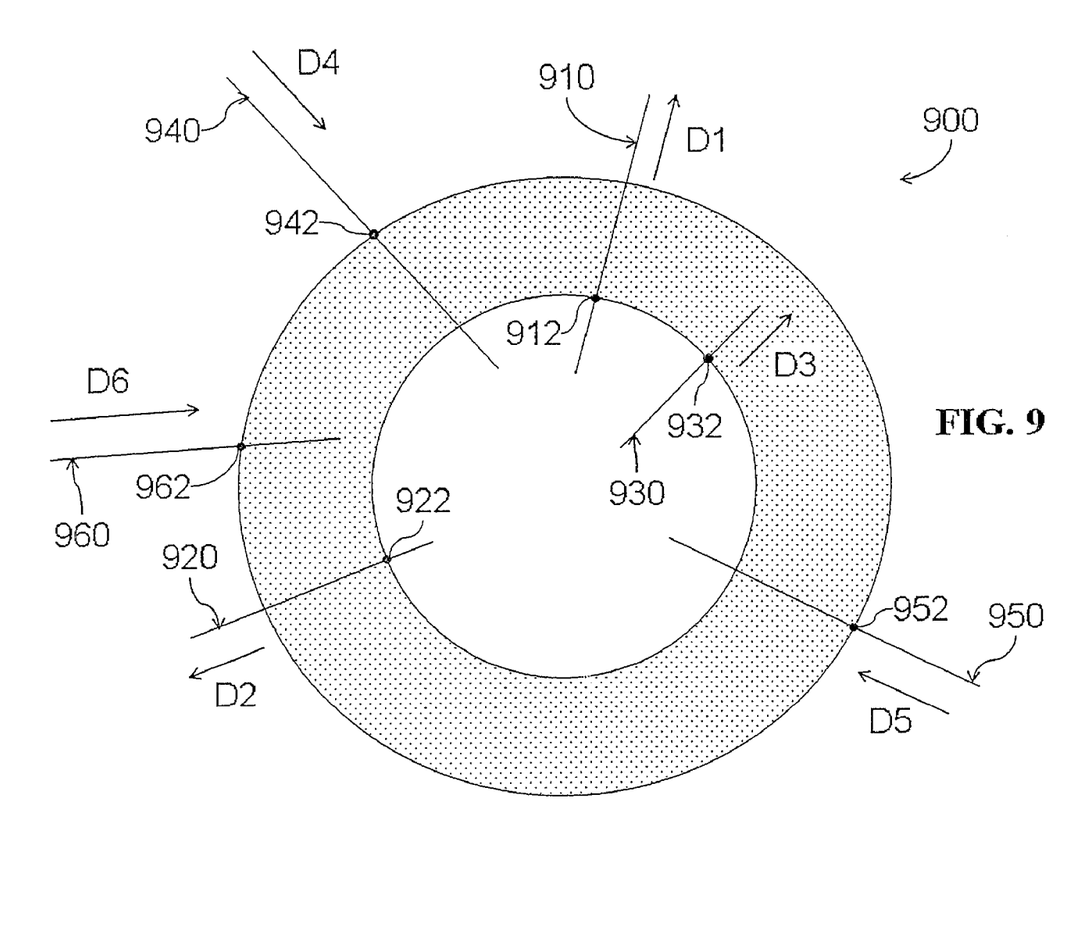
FIG. 9 is a schematic diagram of a cross-section view of a circular tube.

FIG. 9 shows a digital image 900 which is a cross-section view of a circular tube. If the target to be measured is an image feature value related to the interior fringe of the digital image 900, such as the internal diameter or interior cross sectional area of the digital image 900, the user may select the recognition pattern option "Round" that is most approximate to the shape of the interior fringe of the digital image 900 in the operation 230, and set a plurality of lines intersecting the interior fringe of the digital image 900 along a predetermined direction in the operation 250. For example, in the embodiment shown in FIG. 9, lines 910, 920, and 930 are set outward from the inside to the outside of the interior of the digital image 900.

Afterward, the processor 122 in the operation 270 only needs to analyze pixel values on the path of each of the lines 910, 920, and 930 along their respective drawing direction to identify an intersection 912 of the line 910 and the interior image edge of the digital image 900, an intersection 922 of the line 920 and the interior image edge, and an intersection 932 of the line 930 and the interior image edge by using the aforementioned methods. That is, the pixel value analysis for the path of the line 910 is performed along a direction D1, the pixel value analysis for the path of the line 920 is performed along a direction D2, and the pixel value analysis for the path of the line 930 is performed along a direction D3.

In the operation 280, the processor 122 determines a circumference corresponding to the recognition pattern "Round" as the recognition result of the interior image fringe of the digital image 900 based on the intersections 912, 922, and 932.

When the circumference of the interior image edge of the digital image 900 is recognized, the processor 122 may perform the operation 880 to further calculate an image feature value related to the interior image fringe of the digital image 900 based on a zooming scale of the digital image 900. For example, the processor 122 may calculate the internal diameter, radius, perimeter, cross sectional area, average color of the interior cross-section of the circular tube, or the like of the interior image fringe of the digital image 900.

Similarly, if the target to be measured is an image feature value related to the exterior image fringe of the digital image 900, such as the external diameter or exterior cross sectional area of the digital image 900, the user may set a plurality of lines intersecting the exterior fringe of the digital image 900 along a predetermined direction in the operation 250. For example, in the embodiment shown in FIG. 9, lines 950, 960, and 970 are drawn inward from the outside to the inside of the exterior of the digital image 900. The processor 122 in the operation 270 analyzes pixel values on the path of the line 950 along a direction D5 to identify an intersection 952 of the line 950 and the exterior image fringe of the digital image 900, analyzes pixel values on the path of the line 960 along a direction D6 to identify an intersection 962 of the line 960 and the exterior image fringe, and analyzes pixel values on the path of the line 970 along a direction D7 to identify an intersection 972 of the line 970 and the exterior image fringe.

Then, the processor 122 determines a circumference corresponding to the recognition pattern "Round" as the recognition result of the exterior image fringe of the digital image 900 based on the intersections 952, 962, and 972 in the operation 280.

Then, the processor 122 may perform the operation 880 to calculate an image feature value related to the exterior image fringe of the digital image 900 based on a zooming scale of the digital image 900. For example, the processor 122 may calculate the external diameter, radius, perimeter, cross sectional area, average color of the exterior cross-section of the circular tube, or the like of the exterior image fringe of the digital image 900.

By utilizing the aforementioned digital image measuring methods, the digital image analyzing device 100 could rapidly and correctly obtain a specific geometrical feature value related to the image object (such as a length of partial edge, a length of an arc, a radian, an included angle, a central angle, a circumferential angle, a tangential angle, and an image object's perimeter, area, radius, diameter, internal diameter, or external diameter) or a specific image feature value (such as the average color or luminance) with only minimum input from the user.

In addition to recognizing the shape of a particular portion of a digital image, the processor 122 may employ adequate image recognition mechanism to further recognize and compute the location and/or quantity of specific image features (such as particle, crystal structure, or the like) contained in the particular image portion to provide more applications.

As described above, the processor 122 is able to determine the intersection of each line and the image edge of an image object with a precision level less than one pixel. Therefore, when the aforementioned digital image recognition methods applied in digital image measurements, the accuracy of image measurement can be greatly improved.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer program product, stored in a non-transitory computer readable medium, capable of enabling a computer to perform a digital image analysis operation, the digital image analysis operation comprising:
   receiving settings of a plurality of lines corresponding to one or more image edges of a digital image;
   identifying a plurality of intersections of the plurality of lines and the one or more image edges of the digital image; and
   calculating an interval between the plurality of intersections or a path length of the plurality of intersections according to a zooming scale of the digital image.

2. The computer program product of claim 1, wherein the digital image analysis operation further comprises:
   connecting the plurality of intersections to recognize at least one partial edge of the digital image.

3. The computer program product of claim 2, wherein the digital image analysis operation further comprises:
   displaying a plurality of recognition pattern options; and
   receiving settings of one or more recognition patterns selected by a user.

4. The computer program product of claim 3, wherein the operation of connecting the plurality of intersections comprises:
   connecting the plurality of intersections according to the one or more selected recognition patterns.

5. The computer program product of claim 3, wherein the operation of connecting the plurality of intersections comprises:
   determining a plurality of edge lines based on the one or more selected recognition patterns and the plurality of intersections; and
   determining one or more edge portions or whole boundary of the digital image according to the plurality of edge lines.

6. The computer program product of claim 3, wherein the one or more selected recognition patterns correspond to the shape of the digital image.

7. The computer program product of claim 3, wherein the quantity of the plurality of lines is corresponding to the one or more selected recognition patterns.

8. The computer program product of claim 2, wherein the digital image analysis operation further comprises:
  determining a position of a geometrical feature of the digital image according to at least one edge portion of the digital image.

9. The computer program product of claim 2, wherein the digital image analysis operation further comprises:
  calculating a geometrical feature value or image feature value of the digital image according to the edge recognition result.

10. The computer program product of claim 1, wherein the operation of identifying the plurality of intersections comprises:
  analyzing the pixel value of pixels on the path of each line to determine an intersection of the line and the image edge of the digital image.

11. The computer program product of claim 10, wherein the operation of analyzing the pixel value of pixels on the path of each line comprises:
  computing pixel value difference between adjacent pixels on the path of each line; and
  setting a position with the maximum pixel value difference as an intersection of the line and the image edge of the digital image.

12. The computer program product of claim 10, wherein the operation of analyzing the pixel value of pixels on the path of each line comprises:
  computing pixel value difference between adjacent pixels on the path of each line along a predetermined direction; and
  setting the first position where the pixel value difference reaches or exceeds a predetermined threshold as an intersection of the line and the image edge of the digital image.

13. The computer program product of claim 10, wherein the operation of analyzing the pixel value of pixels on the path of each line comprises:
  comparing the pixel value of pixels on the path of each line with a predetermined threshold along a predetermined direction; and
  setting the first position where the pixel value reaches or is across the predetermined threshold as an intersection of the line and the image edge of the digital image.

14. The computer program product of claim 13, wherein the operation of analyzing the pixel value of pixels on the path of each line comprises:
  setting the predetermined threshold for each line based on the pixel values on the path of each line.

15. A digital image analyzing method, comprising:
  receiving settings of a plurality of lines corresponding to one or more image edges of a digital image;
  identifying a plurality of intersections of the plurality of lines and the one or more image edges of the digital image; and
  calculating an interval between the plurality of intersections or a path length of the plurality of intersections according to a zooming scale of the digital image.

16. The digital image analyzing method of claim 15, further comprising:
  displaying a plurality of recognition pattern options; and
  receiving settings of one or more recognition patterns selected by a user;
  determining a plurality of edge lines based on the one or more selected recognition patterns and the plurality of intersections; and
  recognizing one or more edge portions or whole boundary of the digital image according to the plurality of edge lines.

17. The digital image analyzing method of claim 16, wherein the one or more selected recognition patterns correspond to the shape of the digital image, and the quantity of the plurality of lines is corresponding to the one or more selected recognition patterns.

18. The digital image analyzing method of claim 16, further comprising:
  calculating a geometrical feature value or image feature value of the digital image according to the edge recognition result.

19. A computer program product, stored in a non-transitory computer readable medium, capable of enabling a computer to perform a digital image analysis operation, the digital image analysis operation comprising:
  receiving settings of a plurality of lines corresponding to one or more image edges of a digital image;
  identifying a plurality of intersections of the plurality of lines and the one or more image edges of the digital image; and
  analyzing the pixel value of pixels on the path of each line to determine an intersection of the line and the image edge of the digital image, wherein the operation of analyzing the pixel value of pixels on the path of each line comprises:
  computing pixel value difference between adjacent pixels on the path of each line along a predetermined direction; and
  setting the first position where the pixel value difference reaches or exceeds a predetermined threshold as an intersection of the line and the image edge of the digital image.

20. The computer program product of claim 19, further comprising:
  setting the predetermined threshold for each line based on the pixel values on the path of each line.

* * * * *